United States Patent Office 3,494,924
Patented Feb. 10, 1970

1

3,494,924
PREPARATION OF TERTIARY AMINE OXIDES
Giovanni A. Bonetti, Wynnewood, and Rudolph Rosenthal, Broomall, Pa., and Ronald L. Shubkin, Charlotte, N.C., assignors to Atlantic Richfield Company, Philadelphia, Pa., a corporation of Pennsylvania
No Drawing. Filed Sept. 30, 1966, Ser. No. 583,442
Int. Cl. C07c *135/02;* C07d *29/20*
U.S. Cl. 260—293                   10 Claims

ABSTRACT OF THE DISCLOSURE

This invention relates to a method of producing tertiary amine oxides. Tertiary amines, when reacted with tertiary hydroperoxides in excess water, yield the corresponding N-oxides in high yield.

This invention relates to the production of tertiary amine oxides, and has for an object the provision of an efficient, reliable process for producing N-oxides from tertiary amines and tertiary hydroperoxides.

Tertiary amine oxides, also referred to as N-oxides, have gained increasing commercial importance in recent years, particularly in the detergent industry where they are used in liquid dishwashing formulations, shampoos and foam stabilizers. Other uses of N-oxides include their application as floatation agents, polymerization inhibitors, initiators, light stabilizers and petroleum additives, to cite but a few of their applications. Additionally, the fatty amine oxides exhibiting good surface active properties have been found to be biodegradable, an important characteristic because of the current demand for "soft" detergents.

The first studies of N-oxides were made late in the 19th century by Dunston and Goulding [J. Chem. Soc., 75, 794 (1899)], who called these compounds "oxyamines." Since the turn of the century, there have been relatively few articles published on the oxidation of aliphatic amines, although there has been somewhat more published on the oxidation of heterocyclic amines. Cope and coworkers [Org. Reactions, 11, 317 (1960)] and Cram and coworkers [J. Am. Chem. Soc. 81, 1734 (1962)] did considerable work in the area of amine oxidation but their interest was primarily confined to stereospecific olefin formations by pyrolysis of amine oxides. Culvener [Rev. Pure Appl. Chem., 3, 83 (1953)] has published a rather complete review of amine oxide chemistry up to 1953, and more recent bibliography of the recent literature dealing with the production of amine oxides was made available by the Du Pont Company in 1962 ["Amine Oxides—A Literature Survey," Booklet A-25274, Electrochemical Department, E. I. du Pont de Nemours & Company, Inc. (1962)].

The usual methods of oxidizing tertiary amines to their corresponding N-oxides involves the use of oxidants, such as hydrogen peroxide, or organic peracids, such as peracetic, perbenzoic, or perphthalic acids. Other methods involving the use of mono-persulphuric acid, and ozone have also been reported.

However, all of the prior art methods for producing tertiary amine oxides have been handicapped from the standpoint of either involving reaction times which were much too long to be of commercial significance, or requiring the use of expensive, unstable reactants, such as the organic peracids, which required preparation just before use, and the exercise of extreme caution to prevent their detonation. It has also been suggested to incorporate catalysts such as tungstic acid or molybdic anhydride in a hydrogen peroxide system for providing tertiary amine oxides, the catalyst reportedly reducing the time of reaction to a period of a few hours. Disadvantages of the latter method are that the use of an expensive catalyst is required as is the use of expensive hydrogen peroxide as an oxidizing agent.

Use of organic hydroperoxides as oxidizing agents for oxidizing triallylamine to triallylamine N-oxide is suggested in U.S. Patent 3,046,308, Dunn et al. However, the patentees were there concerned with the production of O-allyl-N, N-diallylhydroxylamine, which was produced by heating the triallylamine N-oxide at temperatures of from 30° C. to about 100° C. for a period of from about 0.5 to 5 hours. No specific organic hydroperoxides are disclosed in the patent, whose single example showing the oxidation of triallylamine sets forth the use of hydrogen peroxide as the oxidant, and the reaction time of 7 days.

The production of tertiary alcohols from tertiary hydroperoxides and amines is disclosed in U.S. Patent 2,590,176, Hawkins et al. However, the patent is explicitly directed to the production of tertiary alcohols, and is silent as to any other product of the reaction, with the exception of ketones and unsaturated compounds, which are deemed by the patentees to be undesirable. Indeed, the patentees state that in most cases a considerable portion of the original amine compound may be recovered from the reaction mixture, and that the amine compound served simultaneously as a solvent and a catalyst for the production of the tertiary alcohol from the hydroperoxide.

The work described in the aforesaid Hawkins et al. patent is supplemented by an article [J. Chem. Soc., 4106–4109 (1953)] authored by C. W. Capp and E. G. E. Hawkins, the latter being one of the co-inventors listed in the 2,590,176 patent. In this article, Capp and Hawkins reiterate the observation that much of the amine used in reducing the hydroperoxide to the alcohol was recovered, and that the quantity of amine consumed bears no apparent stoichiometric relation to the amount of hydroperoxide decomposed. The authors also state that the residue remaining after distillation of the reaction products did not appear to contain amine oxides. Finally, the authors state that water is formed in stoichiometric proportion to the oxygen lost by the hydroperoxide, and that the hydrogen involved in the formation of water must have been derived from the amine.

The disclosures of the Hawkins et al. Patent 2,590,176, and the Capp and Hawkins article suggest that the reaction of a tertiary hydroperoxide with a tertiary amine will not produce any amine oxide. This position is strengthened further by the disclosure contained in U.S. Patent 3,236,850, Oswald et al., which teaches that the reaction of a tertiary hydroperoxide with a tertiary amine results in the production of a hydroperoxide-amine salt.

Unexpectedly, we have found that certain tertiary amines can be converted to their N-oxides in high yields and in relatively short periods of time by reacting such amines with tertiary hydroperoxides. We have discovered that tertiary amines in which the amino nitrogen atom is bonded to each of three non-aromatic carbon atoms can be efficiently oxidized to the corresponding N-oxides by reacting such tertiary amines with tertiary hydroperoxides under certain specific process conditions. Our new process can be used to effect the efficient oxidation of any such tertiary amine which is known to oxidize to the corresponding N-oxide, and is generally applicable to the oxidation of all such tertiary amines to their corresponding amine oxides. Inasmuch as our process envisions the use of relatively stable materials which may be handled easily, and affords much higher reaction rates than prior methods for preparing tertiary amines oxides, it is particularly suitable for the commercial production of tertiary amine oxides. Further, the process of our invention also affords highly efficient use of the tertiary hydroperoxide reactant, which can easily and conveniently be recovered for reuse in subsequent amine oxide forming reactions.

Any tertiary amine in which the amino nitrogen atom is the primary reactive moiety with respect to a tertiary hydroperoxide group, and in which each tertiary amino nitrogen atom is bonded to each of three non-aromatic carbon atoms, can be oxidized to provide a tertiary amine oxide in accordance with the present invention. Suitable amines includes the monoamines as well as polyamines such as, for example, diamines, triamines, and tetramines in which the groups bonded to the amino nitrogen atom are hydrocarbon, and substituted hydrocarbon groups whose substituents are non-reactive with the hydroperoxide group to the extent that they would not seriously interfere with the tertiary amine oxide forming reaction. The groups bonded to the amino nitrogen atom can be aliphatic groups of branched chain or straight chain configuration, or they can be cyclic in character. Such groups can be saturated or olefinically unsaturated. Preferably, acetylenically unsaturated aliphatic groups are excluded since in some cases the acetylenic linkage may interfere in the reactivity of the amine nitrogen atom to be oxidized. The amino nitrogen atom may form a part of a heterocyclic ring, and in such instances the remaining atoms of the ring can be only carbon atoms or they can be atoms such as oxygen, or sulphur atoms, for example. The suitable tertiary amines can be of a homogeneous character, i.e., all of the three groups bonded to the amine nitrogen can be the same, or similar, or they may be heterogeneous in character, i.e., where two or all three groups are different one from the other.

Suitable amines will therefore include those falling within the scope of the formula 1) 

where $R_1$, $R_2$, and $R_3$ are independently selected from the class consisting of alkyl groups, cycloalkyl groups, aralkyl groups, alkenyl groups, cycloalkenyl groups, aralkenyl groups, i.e., hydrocarbon groups linked to the amino nitrogen through a non-aromatic carbon atom, or hydroxyaralkyl groups, haloalkyl groups, hydroxyalkenyl groups, haloaralkyl groups, haloalkenyl groups, or the like substituted hydrocarbon groups of similar character, i.e., linked to the amino nitrogen atom through a non-aromatic carbon atom. In addition, $R_1$ can be a single carbon atom connected through $R_2$ and/or $R_3$ so that the structure in Formula 1 above forms a heterocyclic ring.

Examples of suitable types of tertiary amines include the trialkyl amines, such as trimethyl, tributyl, trioctyl, methyldiethyl, isopropyl diamyl, pentyl methyl butyl, and the like amines; alkylol amines, such as triethanol amine, triisopropanol amine, and the like; mixed alkyl alkylol amines, such as a methyl diethanol amine; aralkyl amines, such as tribenzyl amine; halogen substituted hydrocarbon amines, such as tris(beta-chloroethyl) amine, beta-chloroethyldimethyl amine, tribromomethyl diethyl amine; and the homologues and analogues of such amines. Suitable amines of interest because of the properties of the corresponding tertiary amine oxides are the trialkyl amines containing up to 35 carbon atoms, and particularly such amines wherein one of the alkyl groups is a long chain alkyl group of from 8 to 20 carbon atoms, such as capryl, lauryl, cetyl, stearyl or octadecanyl groups, and the other two alkyl groups are lower alkyl groups of up to 6 carbon atoms each, or those other two alkyl groups form a single alkylene group, as in the piperidine or pyrrolidine ring.

Also of interest are tertiary amines falling within the scope of the above formula wherein $R_1$, $R_2$ and $R_3$ are alkyl groups containing up to 20 carbon atoms bonded to the nitrogen atom by an oxyalkylene (—O—alkylene—) group, or by an amidoalkylene [—C(O)NH-alkylene—] group.

Further examples of specific tertiary amines useful in the practice of the process of the invention are N,N dimethyl dodecyl amine, 1-dimethylaminohexadecanol-2, N-methyl piperidine, tri-n-butylamine, N,N dimethylcyclohexylamine, triallyl amine, N,N dimethyl-2-hydroxypropylamine, and triethylenediamine. Other specific tertiary amines in which the amino nitrogen atom is bonded to each of three non-aromatic carbon atoms will readily occur to those skilled in the art.

The tertiary hydroperoxides useful in the practice of the invention can be defined generally as those hydroperoxides containing one or more hydroperoxide groups, each of which is linked to a tertiary carbon atom. They can be substituted or unsubstituted provided, however, that any substitution constituents contained thereon are not reactive groups which would interfere in the tertiary amine oxide forming reaction, i.e., are not reactive with respect to the tertiary amine at the conditions of the amine oxide forming reaction. Preferably, the tertiary hydroperoxides are defined by the formula (2) 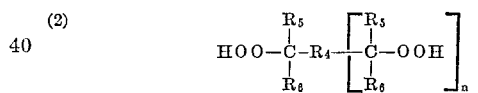

where $n$ is a whole number from 0 to 1, and $R_4$ (when $n$ is 0), $R_5$ and $R_6$ are substituted or unsubstituted hydrocarbon radicals selected from the same group of radicals as $R_1$, $R_2$ and $R_3$ above, and, in addition, $R_4$, $R_5$ and $R_6$ can be alkaryl groups, hydroxyalkaryl groups, haloalkaryl groups, i.e. substituted or unsubstituted hydrocarbon groups bonded to the carbon atom in the above Formula 2 through an aromatic carbon atom. When $n$ is 1, $R_4$ will be a substituted or unsubstituted alkylene or arylene group. Also, $R_4$ can be a single carbon atom connected through $R_5$ and/or $R_6$ so that the structure in Formula 2 above forms a heterocyclic ring. Preferably, $R_4$, $R_5$ and $R_6$ will each contain from one to 20 carbon atoms.

Specific examples of tertiary hydroperoxides that can be used in the practice of the invention are: cumene hydroperoxide, tertiary hydroperoxide of p-cymene, tertiary amyl hydroperoxide, tertiary butyl hydroperoxide, menthane hydroperoxide, diisopropylbenzene dihydroperoxide, 2,5-dimethylhexane-2,5-dihydroperoxide, 1 - methylcyclohexyl hydroperoxide. Other suitable tertiary hydroperoxides will readily occur to those skilled in the art.

In accordance with the process of this invention, the tertiary amine is oxidized to the corresponding N-oxide by contacting in the liquid phase in the presence of water the amine with the tertiary hydroperoxide at a temperature ranging from about 70° C. to about 100° C. The oxidation of the amine can be accomplished at atmospheric, superatmospheric, or subatmospheric pressures, as may be desired. In most cases it will be found that oxidation at substantially atmospheric pressure will be most convenient. Preferred temperatures for effecting the reaction are of the order of from about 75° C. to about 90° C., and temperatures of from about 80° C. to 90° C. being generally most useful. At temperatures below about 60° C. the reaction rate becomes prohibitively slow, and at temperatures above about 100° C. the amount of the N-oxide found in the product falls off.

In general, the mole ratio of the starting reactants (hydroperoxide to tertiary amine) ranges from about 0.5 to about 1.5, and preferably from about 1 to about 1.2.

In the cases where the tertiary amine is a liquid, at the temperature at which the reaction is conducted, it can act as a solvent for the reaction system, and the addition of other inert organic solvents, such as tertiary butyl alcohol, for example, to the system to provide the liquid phase will be unnecessary.

We have found that the addition of water to the reaction system is critical to the attainment of high yields of amine oxide production in accordance with the invention. In this connection, we have found that the use of water as a solvent, or as an additive to the reaction system, preferably in amounts greater than 2 moles (and as high as 28 moles), of water per mole of tertiary amine to be reacted, materially affects the reaction rate as well as the yield of tertiary amine oxide produced. Although larger quantities of water can be used, they offer no additional benefits.

The time required for the completion of the tertiary amine oxide forming reaction in accordance with the process of the invention is a function of the temperature, amount of hydroperoxide used, structure of tertiary amine employed and the amount of water in the reaction mixture. Thus, at 90° C. for one hour, in the case of N,N-dimethyl-2-hydroxypropyl amine in the presence of water, 96% of the amine reacted to give a 97.9% yield of amine oxide based on the reacted amine. At 75° C. for two hours 94.6% of the tertiary amine reacted to give a 98.8% yield of tertiary amine oxide based on the reacted amine. In the case of N,N-dimethyl-n-dodecylamine in the presence of water at 80° C. for 3 hours, 95.4% of the amine reacted to give an essentially quantitative yield of amine oxide based on the reacted amine. The foregoing reactions were conducted at substantially atmospheric pressure.

In conducting the reaction of the amine and the hydroperoxide and the tertiary hydroperoxide it is desirable that the reactants be brought together gradually, and not all at once. The order in which the reactants are introduced into the reaction mixture is not critical, however. In most cases it will be found desirable to mix the amine reactant with the water and any solvent, if it is used, and to add the tertiary hydroperoxide slowly to the stirred reaction mixture, the reaction temperature being controlled as necessary. This is not to say that the reverse order of mixing may not be used. However, addition of the tertiary hydroperoxide to the amine is generally preferred as it permits the much better control of the reaction and also minimizes the production of undesired by-products.

The process of the invention can be practiced either batchwise or continuously. If continuous operation is desired, the tertiary hydroperoxide can be fed continuously to an agitated body of the amine-water mixture maintained in a mix zone at the desired temperature to which zone the amine and water are also fed in a continuous manner. The resulting mixture is then passed or pumped continuously through the tubular reactor maintained at the desired temperature and designed to effect turbulent flow of the material therethrough in a time corresponding to the desired reaction time.

A tertiary amine oxide product can be recovered from the reaction mixture at the completion of the reaction in any one of a number of ways. In many cases, the amine oxide may be recovered simply by distilling off the solvent and the water that was introduced to the reaction mixture. Alternatively, it is possible to dissolve the entire reaction product in an organic solvent such as ether, and extracting with water. The teritary amine oxide may then be recovered from the aqueous layer simply by evaporating the water therefrom.

In order that those skilled in the art may better understand how the present invention may be practiced, the following examples are given by way of illustration and not by way of limitation. All of the oxidations reported below were conducted in the following general manner: The tertiary amine was placed in a suitable reaction vessel equipped with a mechanical stirrer, condenser, thermometer and dropping funnel. In the reactions where water was used as a solvent, it was added directly to the amine at the commencement of the reaction. The desired temperature was maintained with an electric heating mantle. The tertiary hydroperoxide was placed in the dropping funnel and, after the desired temperature was reached in the reaction vessel, the peroxide was allowed to drop in slowly over a period of about one hour. Vigorous stirring was maintained through the course of the reaction, which was found to proceed more quickly and efficiently where agitation of the reactants was continuously achieved.

Recovery of the tertiary amine oxides produced was effected by isolating the oxides by dissolving the entire reaction product in ether and extracting with water. Heavy foaming sometimes occurred during extraction, but this was readily alleviated by the addition of a few crystals of sodium chloride. The aqueous layer was then evaporated down in a crystallizing dish with the aid of a magnetic stirrer and a hot air blower. When the product reached the consistency of a gel, it was placed in a vacuum desiccator over concentrated sulphuric acid, where it was maintained one to 3 days at 1 mm. Hg or lower. The dried product in each case was a white hygroscopic solid. The ether layer was stripped on a Roto-Vac and analyzed by titration.

EXAMPLE 1

By the general method outlined above, N,N dimethyl-2-hydroxylpropylamine N-oxide was prepared in several runs by reacting N,N dimethyl-2-hydroxylpropylamine with cumene hydroperoxide. In all runs the ratio of hydroperoxide to amine was 1.03 and the temperature of reaction was maintained at 75° C. for a 4-hour period. The data obtained from the several runs are set forth in Table I below.

TABLE I

| Run | Mol ratio H²O amine | Mol percent amine reacted based on moles charged | Mol percent reacted amine converted to amine oxide |
|---|---|---|---|
| 1 | 0 | 84.1 | 91.8 |
| 2 | 1 | 84.3 | 95.1 |
| 3 | 2 | 92.0 | 93.9 |
| 4 | 2.78 | 95.9 | 95.4 |
| 5 | 27.8 | 97.7 | 93.4 |

EXAMPLE 2

Example 1 was repeated except that the mol ratio of the hydroperoxide to the amine was adjusted to 1.13 and the reaction was conducted at 90° C. in the presence of water (water-to-amine ratio of 14.3). At the end of one hour of reaction, it was found that 96% of the amine charged to the reaction vessel had reacted, and 97.9% of the reacted amine was converted to the tertiary amine oxide.

EXAMPLE 3

By the general method outlined above several tertiary amine oxides were prepared from a variety of tertiary amines using different types of tertiary hydroperoxide oxidizing agents. The data obtained are set forth in Table II:

about 1.5, to oxidize said amine to its corresponding amine oxide.

TABLE II

| Run No. | Tertiary amine | Tertiary hydroperoxide | Molar ratio hydroperoxide/ amine | Molar ratio H₂O amine | Temp., °C. | Reaction time, hrs. | Mol percent amine reacted based on moles charged | Mol percent reacted, amine converted to amine oxide |
|---|---|---|---|---|---|---|---|---|
| 9 | A | J | 1.14 | 0 | 80 | 4 | 74.4 | 88.2 |
| 10 | A | J | 1.14 | 28.6 | 80 | 4 | 95.4 | 100 |
| 11 | A | K | 1.15 | 0 | 75 | 4 | Only trace of amine oxide | |
| 12 | B | H | 1.07 | 44 | 75 | 4.5 | 96.9 | 100 |
| 13 | C | H | 0.6 | 0 | 85-90 | 6.5 | 66.5 | 72.5 |
| 14 | C | H | 0.66 | 0 | 95-100 | 2.5 | 65.5 | 42.2 |
| 15 | C | H | 1.1 | 0 | 125 | 4 | 48.1 | (¹) |
| 16 | C | H | 0.66 | 23.6 | 60-65 | 7.25 | 67.4 | 85 |
| 17 | C | H | 0.66 | 23.6 | 80-85 | 3 | 60.2 | 92.5 |
| 18 | C | H | 1.0 | 29.6 | 80-85 | 3.5 | 80.5 | 96.4 |
| 19 | C | H | 1.1 | 31.9 | 75 | 4 | 89.2 | 97.5 |
| 20 | C | H | 1.1 | 0 | 80 | 3 | 81.8 | 84.6 |
| 21 | C | H | 1.1 | 27.8 | 80 | 3 | 93.7 | 100 |
| 22 | D | H | 1.1 | 0 | 80 | 3 | 88.2 | 80.8 |
| 23 | D | H | 1.1 | 13.9 | 80 | 3 | 91.8 | 85.5 |
| 24 | E | H | 1.1 | 0 | 80 | 3 | 67.8 | 69.5 |
| 25 | E | H | 1.1 | 27.8 | 80 | 3 | 72.3 | 90.6 |
| 26 | F | H | 1.1 | 0 | 80 | 3 | 56.0 | 88.6 |
| 27 | F | H | 1.1 | 13.9 | 80 | 3 | 86.3 | 91.3 |
| 28 | G | H | 1.1 | 0 | 75 | 3 | 88.1 | 53.2 |
| 29 | G | H | 1.1 | 13.9 | 75 | 3 | 86.4 | 69.1 |
| 30 | A | H | 1.1 | 13.9 | 75 | 1 | 81.3 | 78.2 |
| 36 | A | H | 1.14 | 0 | 75 | 2 | 81.0 | 88.5 |
| 37 | A | H | 1.14 | 14.30 | 75 | 2 | 94.6 | 98.8 |

¹ Only trace of amine oxide.
A—N,N dimethyl-2-hydroxypropylamine. B—1-dimethylamino hexadecanol-2. C—N,N dimethyl-n-dodecylamine. D—N-methyl piperidine. E—Tri-n-butylamine. F—N,N dimethylcyclohexylamine. G—Triallylamine. H—Cumene hydroperoxide. J—t-butyl hydroperoxide. K—di-t-butyl peroxide.

The above examples demonstrate that efficient and reliable production of tertiary amine oxides may be achieved by reacting at a temperature from about 70° C. to about 100° C., and preferably from about 75° C. to about 90° C., in the liquid phase in the presence of water, a tertiary hydroperoxide with a tertiary amine in which the amino nitrogen atom is bonded to each of three non-aromatic carbon atoms, the molar ratio of the tertiary hydroperoxide to the tertiary amine ranging from about 0.5 to about 1.5. The necessity of using a tertiary hydroperoxide in order to provide tertiary amine oxides in accordance with the process of the invention is demonstrated by run No. 11, wherein the use of di-t-butyl peroxide, which is not a tertiary hydroperoxide, was found to produce only a trace of the desired amine oxide. The addition of water, preferably in amounts of about 2 moles of water per mole of tertiary amine, is seen to be critical to the attainment of high yields of the desired tertiary amine oxide.

Cumene hydroperoxide, a commercially available inexpensive tertiary hydroperoxide, supplies particular utility in the production of the tertiary amine oxides in accordance with the process of the invention by virtue of the fact that the by-product formed during the oxidation reaction, alpha, alpha-dimethylphenyl carbinol, formed in very high yields, can be dehydrated to alpha-methylstyrene. This product can subsequently be hydrogenated to cumene, and reoxidized to cumene hydroperoxide, thus providing a source of active oxygen at relatively low cost.

The method of the invention thus provides an efficient, reliable and practical way of reacting tertiary amines of the type specified above with tertiary hydroperoxides to obtain tertiary amine oxides in high yields through a reaction which is substantially faster, and therefore commercially more efficient, than methods heretofore available in the prior art.

What is claimed is:
1. The process which consists essentially of contacting in the liquid phase in the presence of added water at a temperature of about 70° C. to about 100° C. a tertiary hydroperoxide with a tertiary amine in which the nitrogen atom is bonded to each of three non-aromatic carbon atoms, said added water being in excess of two moles per mole of said tertiary amine, the molar ratio of said hydroperoxide to said amine ranging from about 0.5 to about 1.5, to oxidize said amine to its corresponding amine oxide.

2. The process of claim 1 wherein the temperature ranges from about 75° C. to about 90° C.

3. The process of claim 1 wherein said molar ratio ranges from about 1 to about 1.2.

4. The process of claim 1 wherein the tertiary hydroperoxide is cumene hydroperoxide.

5. The process of claim 1 wherein the tertiary hydroperoxide is tertiary butyl hydroperoxide.

6. The process of claim 1 wherein the tertiary amine is an aliphatic tertiary amine.

7. The process of claim 1 in which the tertiary amine is a cycloaliphatic tertiary amine.

8. The process of claim 1 in which the tertiary amine is a heterocyclic tertiary amine.

9. The process of claim 1 which comprises contacting the tertiary hydroperoxide with the tertiary amine under agitation and in the presence of up to 28 moles of water per mole of tertiary amine.

10. The process of claim 1 in which the tertiary amine is of the formula

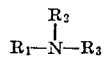

where $R_1$ is a long chain alkyl group of from 8 to 20 carbon atoms and $R_2$ and $R_3$ are lower alkyl groups of up to six carbon atoms each.

References Cited

UNITED STATES PATENTS

| 2,590,176 | 3/1952 | Hawkins et al | 260—617 |
| 3,046,308 | 7/1962 | Dunn et al. | 260—584 |
| 3,410,903 | 11/1968 | Solomon | 260—583 |

OTHER REFERENCES

Cope et al.: J. Am. Chem. Soc., 79, pp. 964–5 (1957).
De la Mare, J. Org. Chem., 25, pp. 2114–26 (1960), pp. 2114, 17, 18, 23–25 supplied.

HENRY R. JILES, Primary Examiner

G. T. TODD, Assistant Examiner

U.S. Cl. X.R.

252—152; 260—326.8, 561, 563, 570.5, 570.8, 570.9, 583, 584